US00RE47175E

(19) United States
(12) Reissued Patent
Reilly et al.

(10) Patent Number: US RE47,175 E
(45) Date of Reissued Patent: Dec. 25, 2018

(54) COMPOSTABLE SINGLE-CUP BREW LID

(71) Applicant: Genpak LP, Aurora (CA)

(72) Inventors: Bill Reilly, Newmarket (CA); Rob Pilcz, Aurora (CA)

(73) Assignee: Genpak LP, Aurora, Ontario (CA)

(21) Appl. No.: 15/468,945

(22) Filed: Mar. 24, 2017

Related U.S. Patent Documents

Reissue of:
(64) Patent No.: 9,321,240
Issued: Apr. 26, 2016
Appl. No.: 13/956,681
Filed: Aug. 1, 2013

U.S. Applications:
(60) Provisional application No. 61/678,828, filed on Aug. 2, 2012.

(51) Int. Cl.

| | |
|---|---|
| ***B32B 27/10*** | (2006.01) |
| ***B32B 29/00*** | (2006.01) |
| ***B65D 43/14*** | (2006.01) |
| ***B32B 3/10*** | (2006.01) |
| ***B65D 65/46*** | (2006.01) |
| ***B32B 27/36*** | (2006.01) |
| ***B32B 23/08*** | (2006.01) |
| ***B32B 7/12*** | (2006.01) |
| *B65D 77/20* | (2006.01) |
| *B65D 85/804* | (2006.01) |

(52) U.S. Cl.
CPC ..... *B32B 3/10* (2013.01); *B32B 7/12* (2013.01); *B32B 23/08* (2013.01); *B32B 27/10* (2013.01); *B32B 27/36* (2013.01); *B32B 29/002* (2013.01); *B65D 43/14* (2013.01); *B65D 65/466* (2013.01); *B32B 2307/31* (2013.01); *B32B 2307/7242* (2013.01); *B65D 77/2024* (2013.01); *B65D 85/8043* (2013.01); *Y02W 90/12* (2015.05); *Y02W 90/14* (2015.05); *Y10T 428/24802* (2015.01); *Y10T 428/24843* (2015.01); *Y10T 428/24934* (2015.01); *Y10T 428/31786* (2015.04)

(58) Field of Classification Search
CPC .. B32B 3/10; B32B 7/12; B32B 23/08; B32B 27/10; B32B 27/36; B32B 29/002; B32B 2307/31; B32B 2307/7242; B65D 43/14; B65D 65/466; B65D 77/2024; B65D 85/8043; Y02W 90/12; Y02W 90/14; Y10T 428/24802; Y10T 428/24843; Y10T 428/24934; Y10T 428/317
See application file for complete search history.

(56) References Cited

U.S. PATENT DOCUMENTS

| | | | | |
|---|---|---|---|---|
| 3,298,831 | A * | 1/1967 | Lau et al. | 430/60 |
| 5,763,100 | A * | 6/1998 | Quick et al. | 428/486 |
| 2010/0040904 | A1* | 2/2010 | Cloutier | B32B 27/08 428/626 |
| 2010/0143678 | A1* | 6/2010 | Reilly et al. | B32B 27/08 428/212 |
| 2010/0178523 | A1* | 7/2010 | Iyengar et al. | 428/458 |
| 2014/0147604 | A1* | 5/2014 | Nevalainen et al. | 428/34.2 |
| 2015/0135967 | A1* | 5/2015 | Hoffman | B65D 85/8043 99/295 |

* cited by examiner

*Primary Examiner* — Terrence Till
(74) *Attorney, Agent, or Firm* — Dinsmore & Shohl LLP

(57) ABSTRACT

A single-cup brew lid material comprises: a compostable printed layer; and a compostable layer that is sealable to PLA single-cup brew containers.

21 Claims, 1 Drawing Sheet

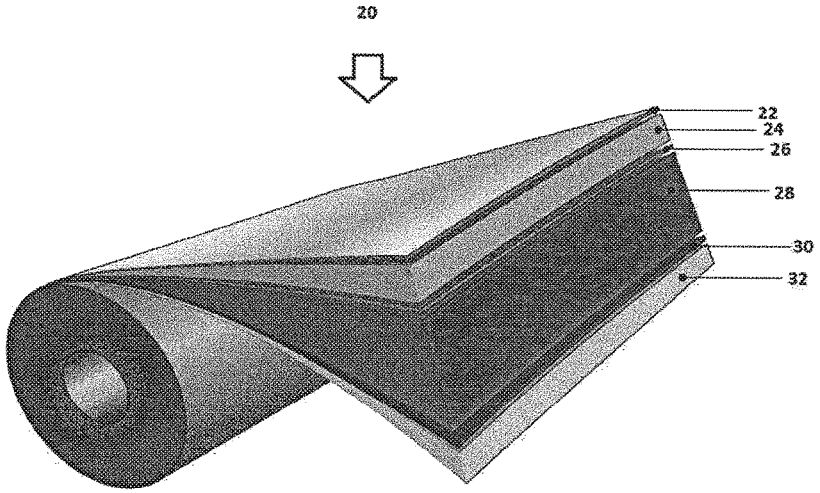
20
22
24
26
28
30
32

COMPOSTABLE SINGLE-CUP BREW LID

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This Application claims the benefit of U.S. Provisional Application 61/678,828 filed on Aug. 2, 2012.

FIELD OF THE INVENTION

The present invention relates to materials used for the manufacture of single-cup brew lids.

BACKGROUND OF THE INVENTION

Single cup brew machines have become popular due to convenience and quality of the beverage produced. The lids for these cups often use foil and other non-compostable materials, sealed to polystyrene or other non-compostable materials. As a result, the lid and cup are typically discarded after use.

SUMMARY OF THE INVENTION

Forming one aspect of the invention is a single-brew cup lid material comprising: a compostable printed layer; and a compostable layer that is sealable to PLA single-brew cups.

According to another aspect of the invention, the compostable layer that is sealable to PLA single-brew cups can comprise a PLA-based film and a compostable core layer, the compostable core layer being disposed between the PLA-based film and the compostable printed layer.

According to another aspect of the invention, the compostable printed layer can be printed paper.

According to another aspect of the invention, the compostable printed layer can be reverse-printed cellulose.

According to another aspect of the invention, the PLA-based film can be metallized.

According to another aspect of the invention, the compostable core layer can be an aliphatic copolyester.

According to another aspect of the invention the compostable core layer can be an compostable extrudate.

According to another aspect of the invention, the compostable core layer can be a compostable film secured to the adjacent layers by adhesive.

According to another aspect of the invention, the PLA-based film can be about a 20 micron metallized PLA film; the compostable core layer can be a 3 mil aliphatic copolyester film; and the printed layer can be a layer of printed about 21#/ream paper According to another aspect of the invention, the compostable core layer can be secured to the printed paper by about 1.5 gsm acrylic adhesive and to the PLA-based film by about 1.0 gsm urethane adhesive.

According to another aspect of the invention, the material can have about the following properties:

Ink adhesion: 100% ink adhesion using Scotch 610 tape

Heat and blister resistance: no visible blistering or ink pick-off when sealed at 150° C., 1 sec dwell time, 40 psi Interlayer bond strength: >100 g/25 mm Elmendorf (propagated)

tear resistance: >150 g both machine direction and transverse direction

Heat seal strength, lid to cup: >1000 g/25 mm, lid sealed against the rim of a PLA cup, 150° C., 1 sec dwell time, 40 psi Oxygen barrier: 0.4 cc/100 in2/24 hr Moisture barrier: 0.2 g/100 in2/24 hr

BRIEF DESCRIPTION OF THE DRAWINGS

FIG. 1 is a stylized perspective view of a lamination according to an exemplary embodiment of the invention.

DETAILED DESCRIPTION OF THE PREFERRED EMBODIMENTS

Reference is made to the exemplary embodiment illustrated in FIG. 1, which will be seen to be a laminate material 20 comprising six (6) layers:

22 6 colour flexographic print

24 21#/ream bleached kraft paper

26 1.5 gsm acrylic adhesive

28 3 mil BASF Ecoflex aliphatic copolyester film.

30 1.0 gsm urethane adhesive

32 80 ga (20 micron) metallized PLA film, supplied by Celplast Metallized Products Limited This material was tested, with results as shown below.

TABLE 1

| Test | Results |
|---|---|
| Ink adhesion | 100% ink adhesion using Scotch 610 tape |
| Heat and blister resistance | Good (no visible blistering or ink pick-off) when sealed at 150° C., 1 sec dwell time, 40 psi |
| Interlayer bond strength | >100 g/25 mm |
| Elmendorf (propagated) tear resistance | >150 g both machine direction and transverse direction |
| Heat seal strength, lid to cup | >1000 g/25 mm, lid sealed against the rim of a PLA cup, 150° C., 1 sec dwell time, 40 psi |
| Oxygen barrier | 0.4 cc/100 $in^2$/24 hr |
| Moisture barrier | 0.2 g/100 $in^2$/24 hr |

In the description above, the following definitions apply:

#/ream yield as lbs. per ream, where a ream is 3,000 square feet gsm yield as grams per square meter mil unit of thickness, where 1 mil=0.001"

ga unit of thickness, where 100 ga=1 mil micron unit of thickness, where 1,000,000 micron=1 meter, and 25.4 micron=1 mil psi lbs per square inch The product was found to be sealable, compostable, and useful in a variety of single cup brewing machines which use a hollow needle to convey hot or cold water into the cup. The structure was observed to create a gasket or self-sealing effect when the hollow needle of the brewing equipment punctures the lid, so that the hot brewing water under pressure cannot escape through the puncture hole.

Other advantages associated with the structure include the potential for reduced needle wear, as a result of the relatively soft, non-metallic substrates that can be employed in the place of the aluminum foil commonly used. As well, the gasket mechanism allows use with a range of film types that can be used on a variety of polymer resins materials used in the base cup. Further, by replacing the aluminum foil commonly used in cup lids with a non-metallic barrier layer such as a nano-composite barrier coating, metal detectors can now be used as an added safety feature.

Without intending to be bound by theory, the bonds, tear resistance and heat seal integrity of the finished lamination appear to be important to the functioning of the material in the brewing machine. While no single test measures the gasket effect, the propagated tear (Elmendorf) test has been found to be helpful as it quantifies the resistance to deformation and breakage of the soft gasket layer.

Whereas but a single exemplary embodiment is illustrated, variations are possible.

For example, whereas in the exemplary embodiment, bleached kraft paper is used, it will be understood that natural, bleached, coloured or coated paper could be used, depending on the appearance and print quality desired.

Further, cellophane can also be used in place of paper, which would typically be reverse printed, to avoid direct exposure of the print to the heat of the sealing operation and avoid ink pick off or scuff.

Additionally, whereas the core layer in the exemplary embodiment is an aliphatic copolyester film such as BASF Ecoflex, other materials, other compostable materials such as Novamont Mater Bi, BASF EcoVio or Indaco Biotope could also be used. The tensile modulus and tear properties of this layer are critical in order to have the softness and memory properties to allow the finished lamination to puncture and then conform tightly to the shape of the of the sharpened hollow needle while not tearing, splitting or zippering, nor causing the lid to become separated from the sealing flange of the cup.

Yet further, whereas in the exemplary embodiment, the inner sealant layer is metalized PLA, other sealable, compostable films such as Novamont Mater Bi, BASF EcoVio or Indaco Biotope could also be used, depending on the cup or container resins used.

Moreover, whereas the exemplary embodiment involves the use of an Ecoflex film core, secured by adhesive, the structure could be produced by extrusion, in which case, that structure would comprise four layers: (i) print; (ii) paper; (iii) extruded Ecoflex resin; (iv) metallized PLA film.

In the exemplary embodiment, metallized PLA film is used; this will normally be the case when a high barrier lamination is required. If high barrier is not required, e.g. due to a barrier overwrap being used to package the filled cups, then regular PLA or other compostable films could and would normally be used.

Other alternate embodiments are shown in the table below

| | LAYERS | | | | | | |
|---|---|---|---|---|---|---|---|
| | Print substrate | | | Adherent | Core layer | Adherent | Sealant layer |
| Type | 1 | 2 | 3 | 4 | 5 | 6 | 7 |
| 1 | Print | paper | | Adhesive | BASF EcoFlex film | adhesive | nano-coated PLA |
| 2 | print | paper | | NA | BASF EcoFlex extrusion lamination | | metallized PLA |
| 3 | Print | paper | | NA | BASF EcoFlex extrusion lamination | | nano composite-coated PLA |
| 4 | print | paper | | adhesive | Novamont Mater Bi film | adhesive | metallized PLA |
| 5 | print | paper | | adhesive | Indaco Biotrope film | adhesive | metallized PLA |
| 6 | | cellophane | print | adhesive | BASF EcoFlex film | adhesive | metallized PLA |
| 7 | | cellophane | print | adhesive | BASF EcoFlex film | adhesive | nano composite-coated PLA |
| 8 | | cellophane | print | | BASF EcoFlex extrusion lamination | | metallized PLA |
| 9 | | cellophane | print | | BASF EcoFlex extrusion lamination | | nano composite-coated PLA |
| 10 | | cellophane | print | adhesive | Novamont Mater Bi film | adhesive | metallized PLA |
| 11 | | cellophane | print | adhesive | Indaco Biotrope film | adhesive | metallized PLA |
| 12 | print | Paper | | adhesive | | | BASF EcoVio film (PLA-based) |
| 13 | print | paper | | | BASF EcoFlex extrusion lamination | | BASF EcoVio film (PLA-based) |
| 14 | print | paper | | adhesive | EcoFlex film | | heat seal coating |

Types 12-14 are not metallized or nano-composite coated, and therefore do not have the high oxygen barrier properties appropriate for extended shelf life. Structures like these can be used when the cups are packed separately into barrier packaging overwrap, or when barrier is not required due to the shelf life requirements of the product.

Yet further variations are possible. Accordingly, the invention should be understood as limited only by the accompanying claims, purposively construed.

The invention claimed is:

1. A single-brew cup lid material comprising:

a compostable printed layer; and a compostable layer that [can] *is adapted to* be sealed to PLA single-brew cups, wherein*:* the compostable layer that can be sealed to PLA single-brew cups comprises a PLA-based film and a compostable core layer, the compostable core layer being disposed between the PLA-based film and the compostable printed layer;

the compostable core layer is aliphatic copolyester; [and]

the compostable core layer is a compostable film secured to the compostable printed layer and the PLA-based film by adhesive*; and*

*the material has the following properties:*

| | |
|---|---|
| *ink adhesion* | *100% ink adhesion using Scotch 610 Tape* |
| *heat and blister resistance* | *no visible blistering or ink pick-off when sealed at 150° C., 1 sec dwell time, 40 psi* |
| *interlayer bond strength* | *>100 g/25 mm* |
| *Elmendorf (propagated) tear resistance* | *>150 g both machine direction and transverse direction* |
| *Heat seal strength, lid to cup* | *>1000 g/25 mm, lid sealed against the rim of a PLA cup, 15 C., 1 sec dwell time, 40 psi.* |

2. A material according to claim 1, wherein the compostable printed layer is printed paper.

3. A material according to claim 1, wherein the compostable printed layer is reverse-printed cellulose.

4. A material according to claim 1, wherein the PLA-based film is metallized.

5. A material according to claim 1, wherein the compostable core layer is a compostable extrudate.

6. A material according to claim 1, wherein the PLA-based film is about a 20 micron metallized PLA film; and the compostable core layer is a 3 mil aliphatic copolyester film.

7. A material according to claim 6, wherein the compostable printed layer is a layer of printed 21#/ream paper.

8. A material according to claim 7, wherein the compostable core layer is secured to the printed paper by about 1.5 gsm acrylic adhesive and to the PLA-based film by about 1.0 gsm urethane adhesive.

[9. A material according to claim 1, having the following properties:

Ink adhesion: 100% ink adhesion using Scotch 610 tape

Heat and blister resistance: no visible blistering or ink pick-off when sealed at 150° C., 1 sec dwell time, 40 psi Interlayer bond strength: >100 g/25 mm Elmendorf (propagated)

tear resistance: >150 g both machine direction and transverse direction

Heat seal strength, lid to cup: >1000 g/25 mm, lid sealed against the rim of a PLA cup, 150' C., 1 sec dwell time, 40 psi.]

10. A single-brew cup lid material comprising:

a compostable printed layer; and a compostable layer that [can] *is adapted to* be sealed to PLA single-brew cups, wherein the compostable layer that can be sealed to PLA single-brew cups comprises a metallized PLA-based film and a compostable core layer, the compostable core layer being disposed between the PLA-based film and the compostable printed layer [the PLA-based film is metallized];

the compostable core layer is a compostable film secured to the PLA-based film and the compostable printed layer by adhesive; [and]

the compostable core layer is an aliphatic copolyester*; and*

*the material has the following properties:*

| | |
|---|---|
| *ink adhesion* | *100% ink adhesion using Scotch 610 Tape* |
| *heat and blister resistance* | *no visible blistering or ink pick-off when sealed at 150° C. 1 sec dwell time. 40 psi* |
| *interlayer bond strength* | *>100 g/25 mm* |
| *Elmendori (propagated)* | |
| *tear resistance* | *>150 a both machine direction and transverse direction* |
| *Heat seal strength, lid to cup* | *>1000 g/25 mm, lid sealed against the rim of a PLA cup, 150° C. 1 sec dwell time, 40 psi.* |

11. A material according to claim 10, wherein the compostable printed layer is printed paper.

12. A material according to claim 10, wherein the compostable printed layer is reverse-printed cellulose.

13. A material according to claim 10, wherein the compostable core layer is a compostable extrudate.

14. A material according to claim 13, wherein the PLA-based film is about a 20 micron metallized PLA film; and the compostable core layer is a 3 mil aliphatic copolyester film.

15. A material according to claim 14, wherein the compostable printed layer is a layer of printed 21#/ream paper.

16. A material according to claim 15, wherein the compostable core layer is secured to the printed paper by about 1.5 gsm acrylic adhesive and to the PLA-based film by about 1.0 gsm urethane adhesive.

[17. A material according to claim 10, having the following properties:

Ink adhesion: 100% ink adhesion using Scotch 610 tape

Heat and blister resistance: no visible blistering or ink pick-off when sealed at 150° C., 1 sec dwell time, 40 psi Interlayer bond strength: >100 g/25 mm Elmendorf (propagated)

tear resistance: >150 g both machine direction and transverse direction

Heat seal strength, lid to cup: >1000 g/25 mm, lid sealed against the rim of a PLA cup, 150' C., 1 sec dwell time, 40 psi.]

*18. A single-brew cup lid material comprising:*

*a compostable printed layer;*

*a sealable, compostable film that is adapted to be sealed to PLA single-brew cups; and*

*a compostable film disposed between the sealable, compostable film and the printed layer and secured to each by adhesive,*

*the material having the following properties:*

| | |
|---|---|
| *ink adhesion* | *100% ink adhesion using Scotch 610 Tam* |
| *heat and blister resistance* | *no visible blistering or ink pick-off when sealed at 150° C. 1 sec dwell time, 40 psi* |
| *interlayer bond strength* | *>100 g/25 mm* |
| *Elmendorf (propagated)* | |
| *tear resistance* | *>150 a both machine direction and transverse direction* |
| *heat seal strength, lid to cup* | *>1000 g/25 mm, lid sealed against the rim of a PLA cup. 150° C. 1 sec dwell time, 40 psi,* |

*19. A material according to claim 18, wherein the sealable compostable film comprises polyester and PLA.*

*20. A material according to claim 18, wherein the compostable printed layer is printed paper.*

*21. A material according to claim 18, wherein the compostable printed layer is reverse-printed cellulose.*

*22. A material according to claim 18, wherein the compostable film is aliphatic copolyester.*

*23. A material according to claim 22, wherein the copolyester film is secured to the printed layer by about 1.5 gsm acrylic adhesive and to the polyester-based film by about 1.0 gsm urethane adhesive.*

* * * * *